Nov. 26, 1940.   R. W. DINZL   2,223,281
HYDRAULIC PRESS AND CONTROL SYSTEM
Filed June 9, 1936    8 Sheets-Sheet 1

Fig. 1

INVENTOR
R. W. Dinzl
BY
ATTORNEY

Nov. 26, 1940. R. W. DINZL 2,223,281
HYDRAULIC PRESS AND CONTROL SYSTEM
Filed June 9, 1936 8 Sheets-Sheet 3

INVENTOR
R. W. Dinzl
BY
ATTORNEY

Nov. 26, 1940.    R. W. DINZL    2,223,281
HYDRAULIC PRESS AND CONTROL SYSTEM
Filed June 9, 1936    8 Sheets-Sheet 4

INVENTOR
R. W. Dinzl
ATTORNEY

Nov. 26, 1940.  R. W. DINZL  2,223,281
HYDRAULIC PRESS AND CONTROL SYSTEM
Filed June 9, 1936    8 Sheets-Sheet 5

INVENTOR
R. W. Dinzl
BY
ATTORNEY

Patented Nov. 26, 1940

2,223,281

UNITED STATES PATENT OFFICE 2,223,281

HYDRAULIC PRESS AND CONTROL SYSTEM

Richard W. Dinzl, Narberth, Pa., assignor, by mesne assignments, to The Baldwin Locomotive Works, a corporation of Pennsylvania Application June 9, 1936, Serial No. 84,300

24 Claims. (Cl. 113—45)

This invention relates to an improved toggle press and controls therefor for shaping and forming sheet metal products such as automobile bodies and parts, although certain of the principles of construction and operation are applicable to presses for other uses as well as to other types of presses.

Presses of the mechanically operated toggle type have been long known, but the probability of damage to the press is unusually great in case of maladjustment of the dies or accidental introduction of more than one blank or of foreign material between the dies. The dies, especially for automobile bodies, are extremely expensive and hence it is of the greatest concern to avoid breakage or serious damage thereto. In addition to the cost of repairs to the press or dies, there is also the element of time required to repair the damage. In the mass production of automobile bodies or other work, it is of the utmost importance to reduce to an absolute minimum all possible delays in the operation of a press because the press is usually one of the machines in the production line. Hence if such a machine is out of service, the full production line is either slowed up or brought to a standstill with consequent increase in production costs. Notwithstanding the known disadvantages or potential liabilities and hazards incident to mechanically operated toggle presses, yet heretofore the press has been protected only by makeshift attachments and arrangements. Very limited progress has been made toward the complete elimination of the inherent fundamental causes of the disadvantages. The result is that such types of presses have continued in use because of the inability over a great number of years to eliminate the source of such defects.

It is an object of my invention to provide an improved toggle press that eliminates the defects above pointed out and to do so in a manner that is relatively simple and yet is sturdy and compact combined with economical operation and maintenance considering the capacity of a press of this type, and at the same time maintain positive operation and control together with the ability to avoid the destructive effects of forcing the toggles to their final normal position upon occurrence of an abnormal condition.

A further object is to provide an improved combination of press elements and controls whereby multiple press operations, specifically triple, may be performed with smoothness, dispatch, complete control and positiveness together with economy of operation and maintenance and dependability. A further object is to provide an improved combination whereby the triple action slide mechanism may have a high degree of flexibility of use, which is broadly accomplished by providing a simple and effective structure capable of either press or cushioning operations, or both, and to utilize certain of the press operating structure in a novel manner as an equalizing mechanism during the cushioning operation.

A further object is to provide a press having inner and outer slides, one of which is normally the blank holder and the other the die slide, in combination with improved means for interrelating the operation of the two slides so as to cause their movements to be not only rapid but also positively coordinated to insure necessary flexibility of operation at the moment the blank holder contacts the blank and the die slide continues its movement, it being a further object to accomplish this with an improved combination requiring power equipment of minimum size and capacity.

I have accomplished certain of the foregoing objects by providing in one specific aspect of the invention an improved combination of toggle mechanism and hydraulic force producing rams and cylinder so constructed and related as to accomplish all of the beneficial operations of mechanical toggle presses but without the disadvantages thereof while at the same time accomplishing many of the desirable advantages of straight hydraulic presses. In a further specific aspect of the invention the hydraulic rams and cylinders are preferably so constructed as to constitute means for limiting movement of the toggles and press slides during normal conditions and yet prevent destructive power forces being transmitted to the press elements in the event of abnormal conditions.

Other objects and advantages will be more apparent to those skilled in the art from the following description of the accompanying drawings in which.

Press structure

Figure 1:
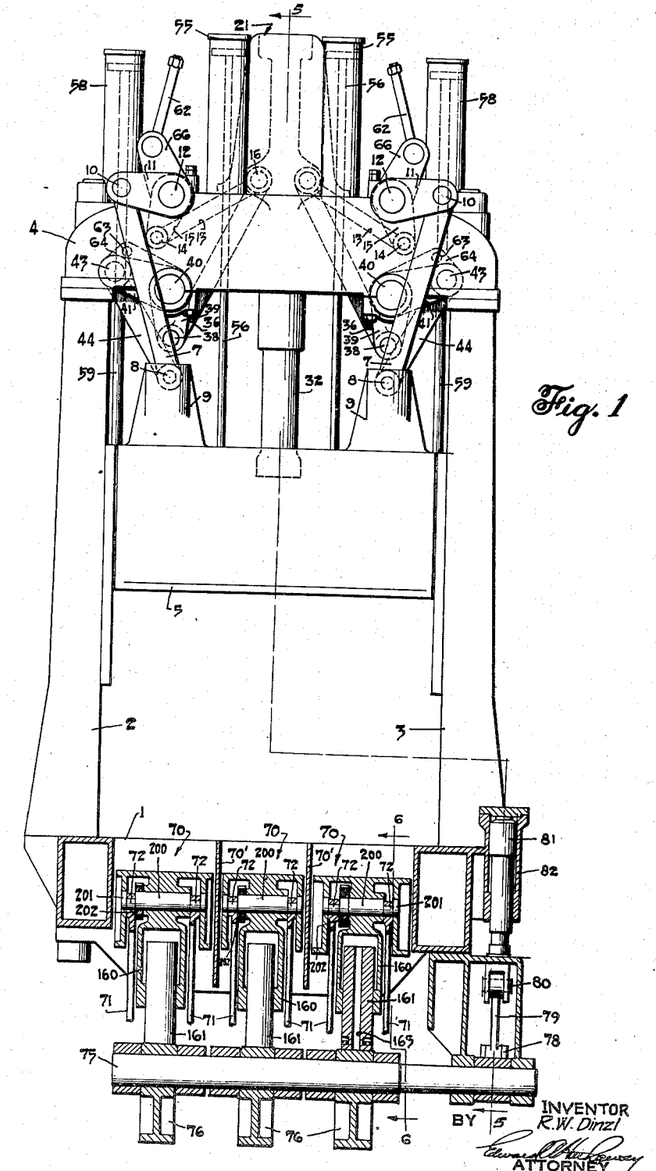
Fig. 1 is a front elevation of the press with the bottom slide structure shown in section.
Figure 2:
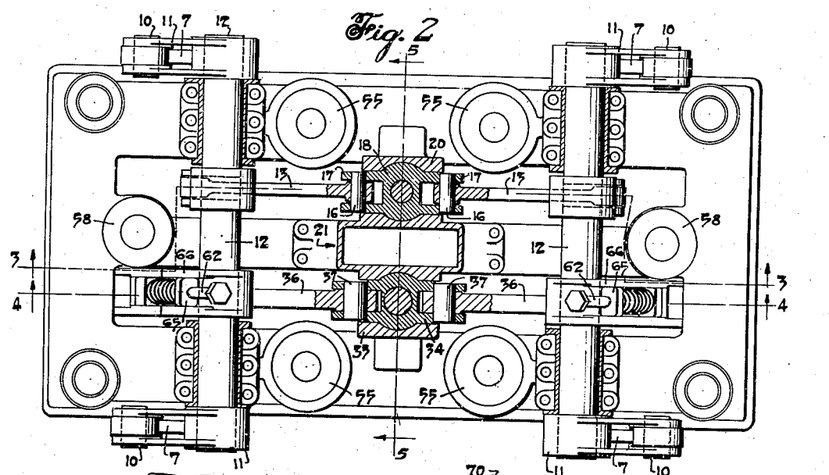
Fig. 2 is a plan view of the press with certain parts shown in horizontal section such as the toggle rock shaft bearings for the outer slide, and the crosshead and guides for both toggle systems.
Figure 3:
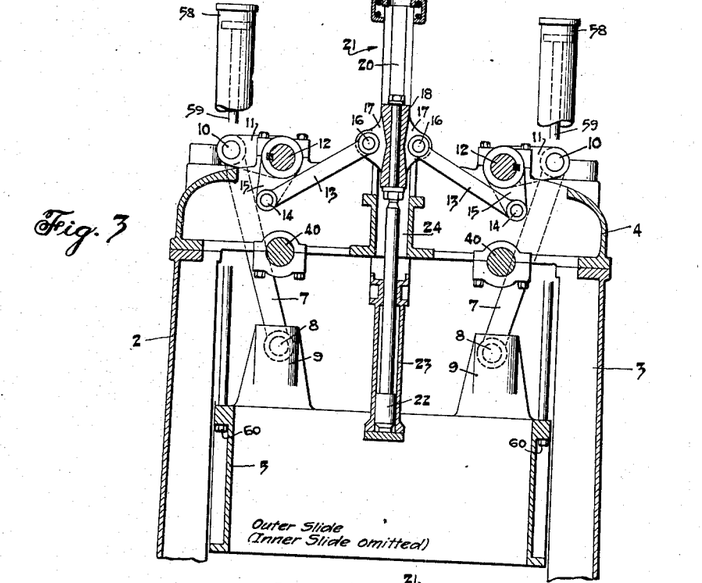
Fig. 3 is a vertical section of the upper portion of the press taken on the line 3—3 of Fig. 2 with certain portions omitted for clarity to show the outer slide toggle system.
Figure 4:
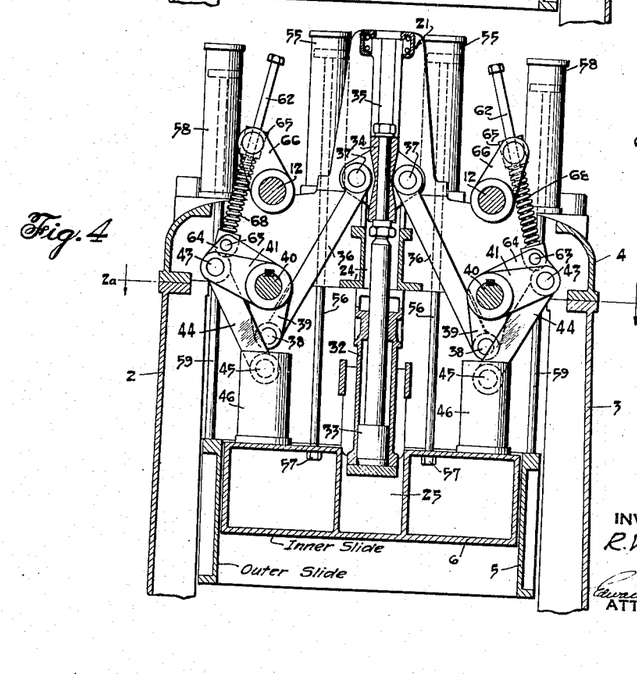
Fig. 4 is a vertical section of the upper portion of the press taken on the line 4—4 of Fig. 2 to show the inner slide toggle system, certain parts of the outer slide toggle system being omitted for clarity.
Figures 5, 7:
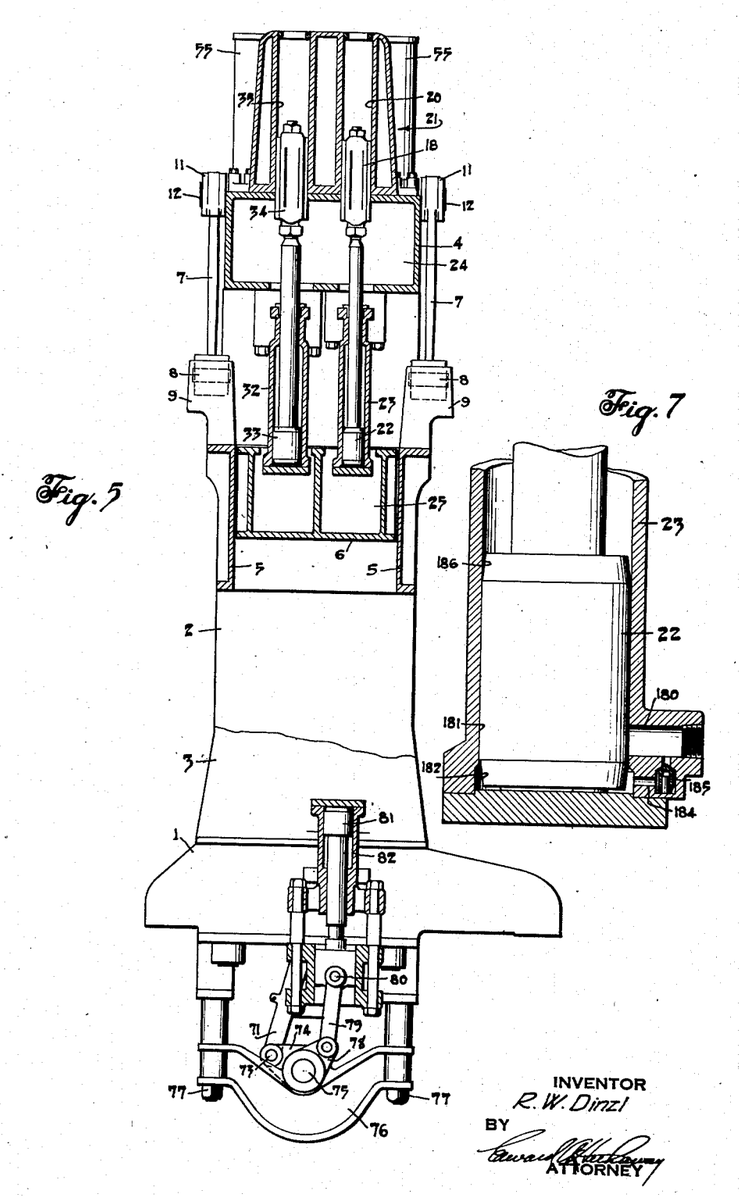
Fig. 5 is a transverse vertical system taken on the line 5—5 of Fig. 1 and generally on line 5—5 of Fig. 2.
Fig. 7 is an enlarged fragmentary section of any one of the operating ram and cylinder constructions adapted to be used at each end thereof.

In the particular embodiment of the invention, such as is disclosed herein merely for the purpose of illustrating one specific form among possible others that the invention might take in practice, I have shown in Fig. 1 a press having a lower stationary base frame 1, frame sides 2 and 3 and an upper cross member 4 connecting the frame sides. As shown in Figs. 1, 3 and 4, an outer slide 5, preferably used as a blank holder, is suitably guided by the frame sides 2 and 3 while an inner die slide 6 (Figs. 4 and 5) is disposed within, and is slidably guided by, the outer slide. The toggle mechanisms at each end of the inner slide are identical. Also the toggle mechanisms at each end of the outer slide are identical. Hence only the toggle mechanism at one end of each slide need be described inasmuch as the press is symmetrical about the transverse median line. Similar parts are, therefore, given similar reference numbers. As shown in Fig. 3, one end of a link 7 is pivotally connected at 8 to a suitable outer slide projection 9 while the other end of said link is pivotally connected at 10 to an arm 11 secured to one of the outer ends of a transverse rock shaft 12. This shaft extends for the full depth of the press and is journalled in the upper portion of cross member 4. Another link 13 is pivotally connected at 14 to an arm 15 while the other end of said link is pivotally connected at 16 to one ear 17 of a crosshead 18. As shown in Figs. 2 and 5, the crosshead 18 is guided for vertical movement in a suitable slideway 20 formed in an upwardly projecting guideway structure 21 (Figs. 1, 3 and 5) which is bolted on top of frame cross member 4. Secured to and projecting downwardly from the lower end of crosshead 18 is a two-way operating ram 22 disposed within a cylinder 23. This cylinder depends from and is bolted to the under side of cross member 4 in alignment with a suitable piston rod passage 24 extending through said member 4. To receive the lower end of the cylinder when the press is in its up-position, an enlarged recess 25 (Figs. 4 and 5) is formed in inner slide 6. As is apparent from Fig. 2, this cylinder lies in the transverse median line of the press but is offset to one side of the longitudinal median line toward the back of the press. However, to impart uniform operating movement to the four corners of the outer slide, each end of each shaft 12 is provided with arms 11 and links 7, which links are located on the outside of cross member 4 as clearly seen in Figs. 2 and 5.

Figure 2A:
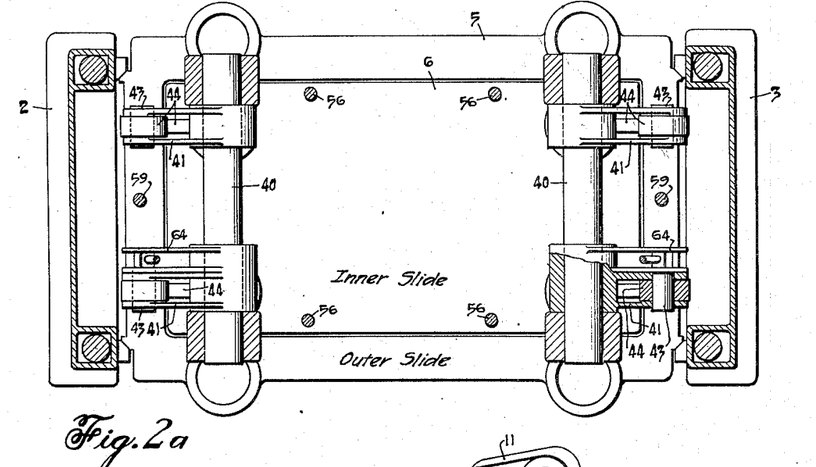
Fig. 2a is a horizontal section taken substantially on line 2a—2a of Fig. 4 to show the rock shafts for the inner slide and the four arms for operating the same, other parts being omitted for clarity.

The hydraulic power producing means for the inner slide includes as shown in Figs. 2, 4 and 5 a cylinder 32, a double acting ram 33 and a crosshead 34 guided in a suitable slideway 35 which is formed in the guideway structure 21 previously described. The foregoing ram and cylinder construction is identical to that for the outer slide including all details described in connection therewith except that the inner slide ram is of larger diameter and is located toward the front of the press. The toggle mechanism for the inner slide includes a link 36, one end of which is pivotally connected at 37 to ears of a crosshead 34 and the other end of which is pivotally connected at 38 to an arm 39 which is secured to a transverse rock shaft 40. This shaft is suitably journalled at the bottom of frame member 4 and has two axially spaced arms 41 (Figs. 2a and 4) located within the inner limits of the frame structure. These arms are pivotally connected as at 43 to links 44, the lower ends of these links being pivotally connected as at 45 to suitable bosses 46 projecting upwardly from inner slide 6 at each of the four corners thereof.

The inner slide is normally held in an uppermost balanced position by a plurality of air cylinders 55, Fig. 4, supported on top of frame member 4 and having pistons and piston rods 56 extending downwardly for connection to the inner slide as at 57. Likewise the outer slide is normally held in an uppermost balanced position by a plurality of air cylinders 58, Fig. 3, supported on top of the frame member 4 and having pistons and piston rods 59 extending downwardly for connection to the outer slide as at 60.

To coordinate the operation of the inner and outer slides in order to obtain maximum speed of operation with minimum size power equipment, I have provided an improved coordinating mechanism between the two toggle systems. This includes a rod 62 whose lower end is pivotally connected as at 63 to an ear 64 of arm 41. The rod 62 slidably extends through a yoke 65 (Figs. 4 and 8) which is transversely pivotally supported in an arm 66 secured to outer slide rock shaft 12. A collar 67 is slidably mounted on rod 62 and rests on top of a normally uncompressed spring 68 surrounding rod 62 and seated thereon adjacent its pivot 63. This construction is duplicated on each side of the transverse median line. There are only two of these coordinating mechanisms, they being associated with the toggle arms located toward the front of the press. To adjust the length of draw stroke of the inner slide, it is only necessary to insert collars 67 of different thicknesses.

Figure 6:
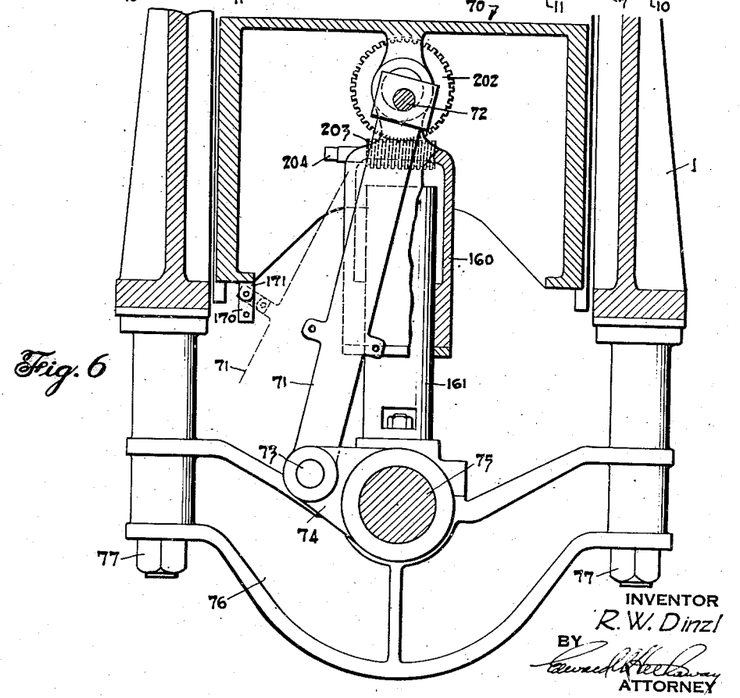
Fig. 6 is a transverse section of the lower portion of the press taken on the line 6—6 of Fig. 1.

As shown in Figs. 1 and 6, the lower press platen 1 is provided with a plurality of bottom or triple action slides generally indicated at 70, specifically three in number, although more or less can be used. Suitable transverse stationary partitions 70' may be provided. Each slide is operated by a pair of links 71 whose upper ends are pivotally connected at 72 to the slide 70 and whose lower ends are pivotally connected to arms 74 as at 73. These arms are secured to a common longitudinal shaft 75 suitably journalled on a series of transverse supporting beams 76. These beams are dependently secured to the under side of base 1 by a series of bolts 77. One end of shaft 75 (Fig. 5) has an arm 78 pivotally connected to one end of a link 79 whose other end is pivotally connected at 80 to a double acting ram 81. A ram cylinder 82 is supported on one end of base 1. The structure as described provides a triple action press in which the upper and lower slides are actuated by opposed cooperative hydraulic forces insuring maximum speed of operation consistent with safety, efficiency, minimum maintenance and other advantages resulting from the opposed hydraulic operation.

*Control system and operation of press*

The press as described is capable of making triple press operations in the following sequence. First, the inner and outer slides move downwardly together until the outer slide, functioning as a blank holder, engages the work piece; second, the inner slide continues its movement to perform a drawing operation; and third, near or upon completion of the down movement of the the inner slide the bottom slides move upwardly to perform an upward press operation on the work piece. Thereafter the bottom slides move downwardly away from the work piece simultaneously with upward movement of the inner slide which mechanically picks up and carries the outer slide upward for a certain distance whereupon upward movement of the outer slide is continued under its own hydraulic power until the two slides have reached their uppermost position.

Figure 9:
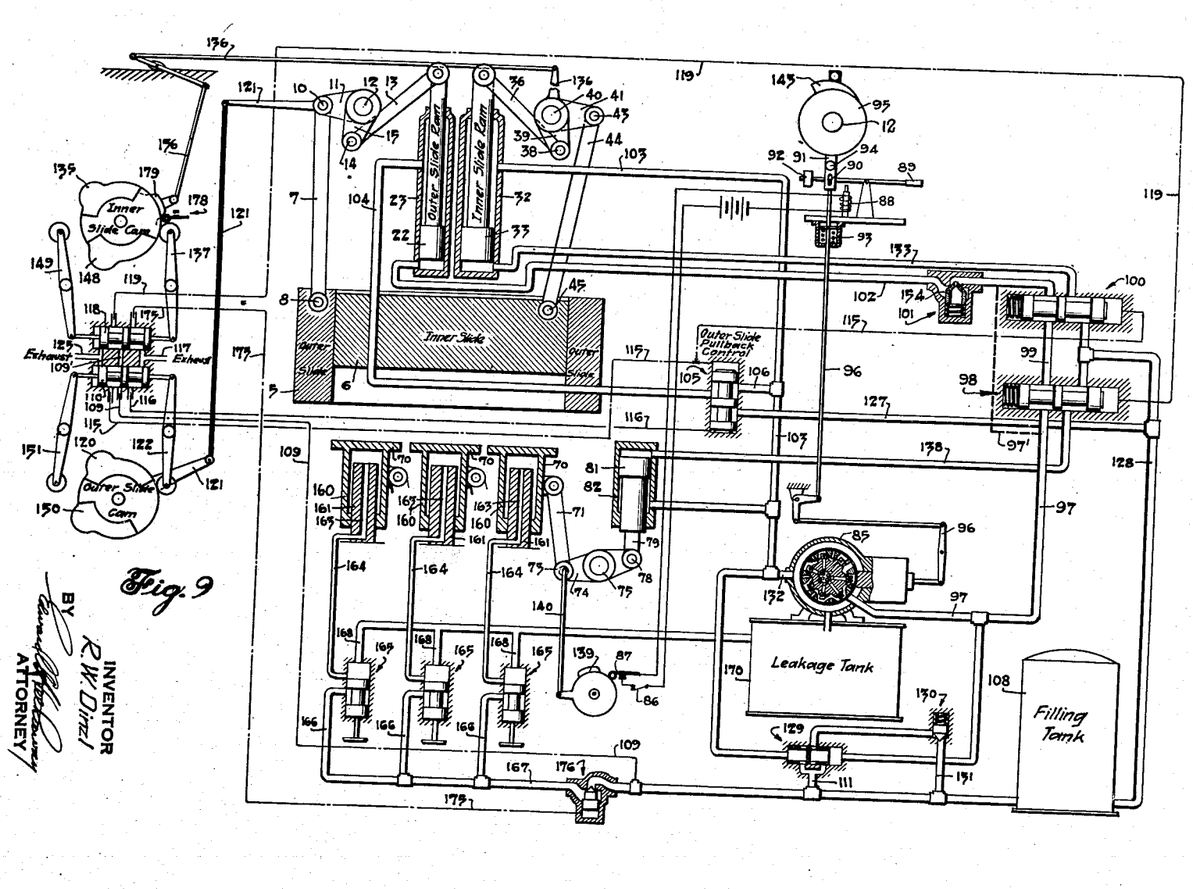
Fig. 9 is a diagrammatic layout of the press operating mechanism and control system, with the inner and outer slides shown in their uppermost position and the bottom slides in their lowermost position while the elements of the control system are in a position for holding the slides in their positions indicated.

The controls for effecting these operations will be more readily understood by specifically describing the mode of operation thereof. It will be understood that a continuous uni-directional motor driven pump 85 of the reversible positive displacement type is preferably employed. To initiate down movement of the inner and outer slides, the operator first closes a suitable switch diagrammatically indicated at 86, Fig. 9, thereby closing a circuit through a normally closed limit switch 87 to energize a suitable actuating or thruster device diagrammatically indicated as a solenoid 88. This thruster thereupon raises a hand lever 89 which has a pin and slot connection 90 with a cam follower yoke 91. The yoke is biased to its lower position, with the pin in the lower end of the slot, through a weight 92. However, as lever 89 is raised, a spring 93 urges follower 91 upwardly until a cam follower roller 94 engages the uniform peripheral portion of an outer slide control cam 95 which is shown in the position corresponding to the uppermost position of the outer slide. Upward movement of yoke 91 causes a series of pump control links and levers 96 to adjust pump 85 so as to discharge pressure liquid through a pipe 97, a bottom slide control valve 98 disposed in its left hand position, pipe 99, an inner slide control valve 100 disposed in its left hand position, check valve 101 and pipe 102 to the lower end of the outer slide cylinder 23, thereby raising ram 22 and crosshead 18 to actuate the outer slide cylinder toggle mechanism and cause downward movement of said slide. The foregoing flow connection through control valves 98 and 100 is continuous at all times regardless of the valve positions. Hence the effect of the foregoing is to have a straight connection between the pump and check valve as indicated by dotted line 97' which may be used if desired.

Figure 8:
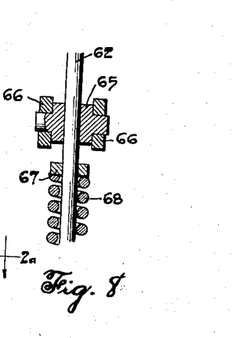
Fig. 8 is an enlarged sectional view of a portion of the mechanical coordinating mechanism between the inner and outer slides.

*Mechanical coordinating mechanism for inner and outer slides.*—After the outer slide initially moves down a slight distance, the inner slide is simultaneously mechanically moved down through the coordinating mechanism between the toggle systems for the inner and outer slides including elements 62—68, Figs. 4 and 8. The arms 66 are connected to the outer slide toggle shafts 12 and hence cause yokes 65 to slide downwardly on rod 62 to engage collar 67, the springs 68 clushioning said engagement while at the same time transmitting the operating force through pins 63 to toggle arms 41 to cause downward movement of the inner slide against the balancing air pressure in air cylinders 55. Hence the inner and outer slides are positively moved together upon initiation of outer slide movement without any power being applied to the hydraulic cylinder 32 for the inner slide although during this movement the lower end of said cylinder 32 is supplied with low pressure filling fluid from filling tank 108 as through pipe 128, valve 100 and pipe 133. During said simultaneous down movement of the inner and outer slides, the hydraulic ram 33 (Fig. 9) displaces liquid from the upper end of its cylinder through pipes 103 and 132 connecting directly to the suction side of pump 85. Simultaneously, ram 22 displaces liquid from the upper end of its cylinder 23 through a pipe 104, a three-way outer slide pull-back control valve 105 which is in its down position, and pipes 106, 103 and 132 to pump 85. Said valve 105 is held in its down position by control pressure supplied from any suitable source, such as a filling tank 108, through a pipe 109, a pilot valve 110 (in its right hand position) and a pipe 115, the control pressure in pipe 115 also urging valve 100 to its left position. The other end of valve 105 is connected to exhaust through a pipe 116, valve 110 and pipe 117. During down movement of the outer slide, valve 98 is also held in its left position by pressure supplied from the filling tank through pipe 109, valve 110, a passage 109', a valve 118 in its right hand position, and line 119.

Figure 10:
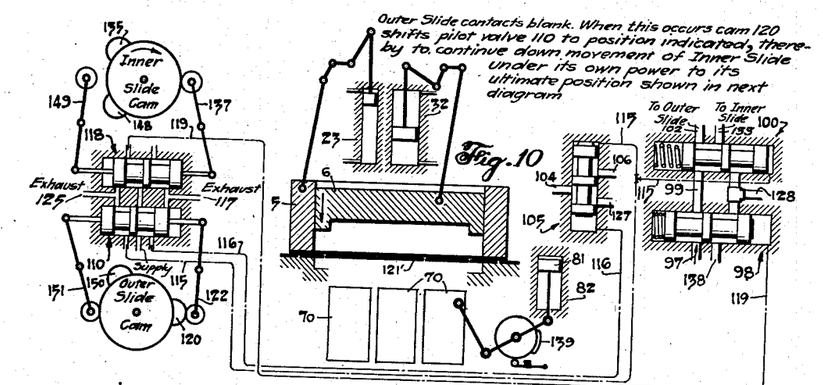
Figs. 10 to 14 are sequence diagrams showing the relative positions of several parts during successive operations after the press is started, many elements and connections being omitted for sake of simplicity and clarity.
Figure 11:
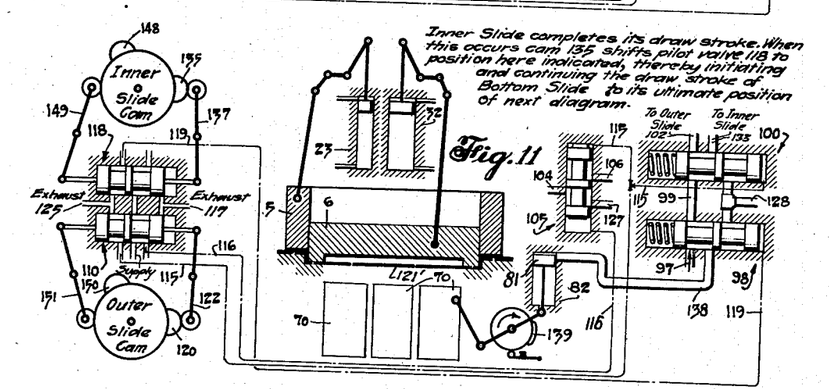

*Inner slide movement continued downwardly by its own hydraulic power.*—Downward movement of the outer slide simultaneously rotates a cam 120 (Fig. 9) in a clockwise direction through any suitable linkage connection 121 between the cam and slide. Substantially simultaneously when the outer slide engages the blank 121' as shown in Fig. 10, cam 120 engages a cam follower lever 122 to shift pilot valve 110 to the left, thereby admitting control pressure from pipe 109 (Fig. 9) to pipe 116 and simultaneously exhausting pressure through pipe 115, valve 110 and pipe 125, thereby moving valve 105 upwardly to the position shown in Fig. 10 to connect the upper end of the outer slide cylinder 23 (pipe 104) to the filling tank 108 through valve 105 and pipes 127 and 128 and closing the connection between pipes 104 and 106 which had previously been connected to the pump. This shifting of valve 105 is in preparation for a subsequent pullback operation. Simultaneously the control valve operating pressure in the right end of valve 100 is exhausted through pipe 115 in the manner just described for valve 105, thereby causing valve 100 to be moved to the right by suitable biasing means such as a spring at the left end of the valve. Shifting of valve 100 to the right still maintains the pump connection between pipes 97, 99 and 102 so that the outer slide ram 22 maintains a blank holding pressure during a subsequent drawing operation by the inner slide. When the valve 100 is thus shifted to its right position, pump pressure is also discharged through pipe 97, valve 98, pipe 99, valve 100, and a pipe 133 to the lower end of inner slide cylinder 32. Ram 33 thereupon moves upwardly under its own hydraulic power to operate the inner slide toggle mechanism and cause continued downward movement of the inner slide to the position shown in Fig. 11. This downward movement is, of course, resisted to a small extent by the balancing air pressure in air cylinders 55 and also the downward movement is accompanied by coordinating rods 62 sliding downwardly through yoke 65 which now remain stationary due to no movement of the outer blank holder slide.

*Initiation of up-movement of bottom slides.*—During downward movement of the inner slide, a cam 135 is rotated in a clockwise direction through links 136 (Fig. 9) or other suitable mechanism operatively connected to the inner slide through its toggle mechanism. When the inner slide reaches substantially its lowermost position (Fig. 11), cam 135 substantially simultaneously engages a lever 137 to shift valve 118 to the left. Thereupon pipe 119 is connected through valve 118 to exhaust pipe 125, thereby relieving the pressure at the right end of valve 98 so that suitable biasing means at the left end thereof, such as a spring or pressure fluid, can move said valve to the right.

Figure 12:
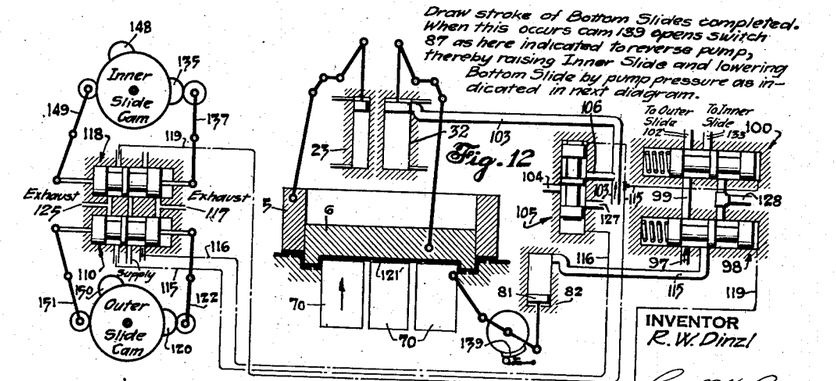

When valve 98 is in its right position, pump pressure is discharged through pipe 97, valve 98 and pipe 138 to the large end of cylinder 82, thereby moving two-way ram 81 (Figs. 1 and 9) downwardly to operate the toggle and shaft mechanism 71, 74, 75, 78 and 79 and accordingly move the lower or bottom action tables or slides 70 upwardly to perform a third press operation (Fig. 12). During this operation, the inner and outer slides remain stationary in their lowermost position. Even though valve 98 is shifted to the right, it maintains pump connection between pipes 97, 99, 102 and 133, thereby positively hydraulically holding the inner and outer slides in their down position during the upward press operation by the bottom tables 70. The advantages of this positive hydraulic holding operation will be amplified later in connection with an additional cooperative function of definitely limiting movement of the slides.

As the bottom action tables 70 move upwardly, a cam 139 is simultaneously rotated in a clockwise direction through any suitable operative connections 140 (Fig. 9) with said slides. Substantially simultaneously with completion of upward movement of the bottom slides as shown in Fig. 12, cam 139 engages the arm of switch 87 to open the same and thereby deenergize the thruster mechanism 88 (Fig. 9) whereupon weight 92 moves yoke 91 downwardly and thereby reverses pump 85 to its pullback stroke through operating connections 96.

Figure 13:
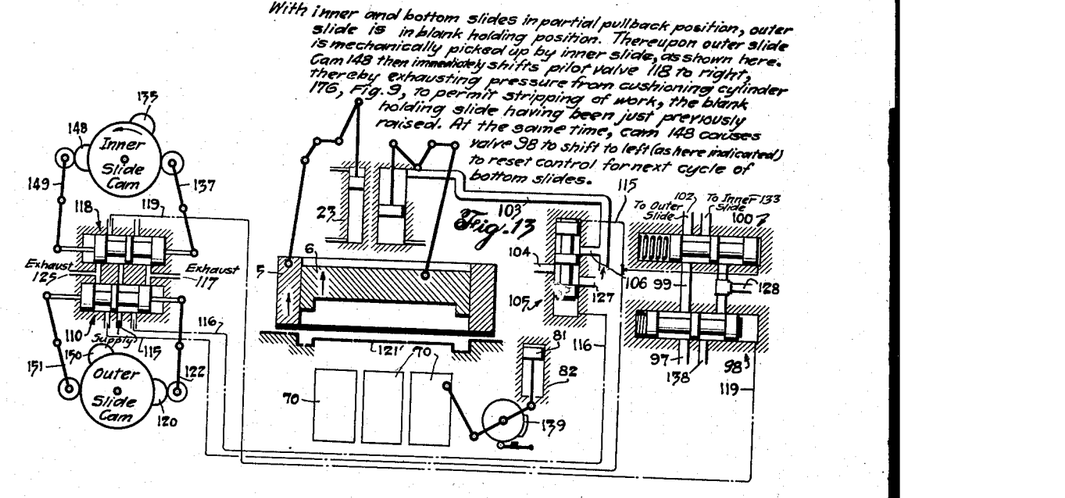

*Pullback operation of bottom and inner slides.*—Upon initial reversal of the pump as just described, it discharges through pipe 132 to the small pullback end of the bottom slide cylinder 82, and the pump pressure in pipe 132 shifts a differential valve 129 to the right, thereby connecting fluid-return pipe 97 through valve 129 and passage 111 directly to filling tank 108 and at the same time connecting the high pressure pump discharge side 132 to a safety valve 130 through ports in valve 129. Hence pump pressure in the lower end of cylinder 82 raises ram 81 and accordingly moves the bottom slides downwardly as shown in Fig. 13 and at the same time some of the fluid from the large end of cylinder 82 is drawn back through pipes 138 and 97 to the suction side of the pump while the remaining fluid exhausts from pipe 97 through valves 129 to the filling tank. Simultaneously fluid pressure is supplied from the pump through pipes 132 and 103 to the small pullback end of the inner slide cylinder 32. Fluid from the large end thereof flowing back through pipes 133, valves 100 and 98, and pipe 97 to partly return to the suction side of pump 85 and the remainder returning to the filling tank through valves 129 and pipe 111. Thus the inner slide starts up simultaneously with the down movement of the bottom slides 70.

Figure 14:
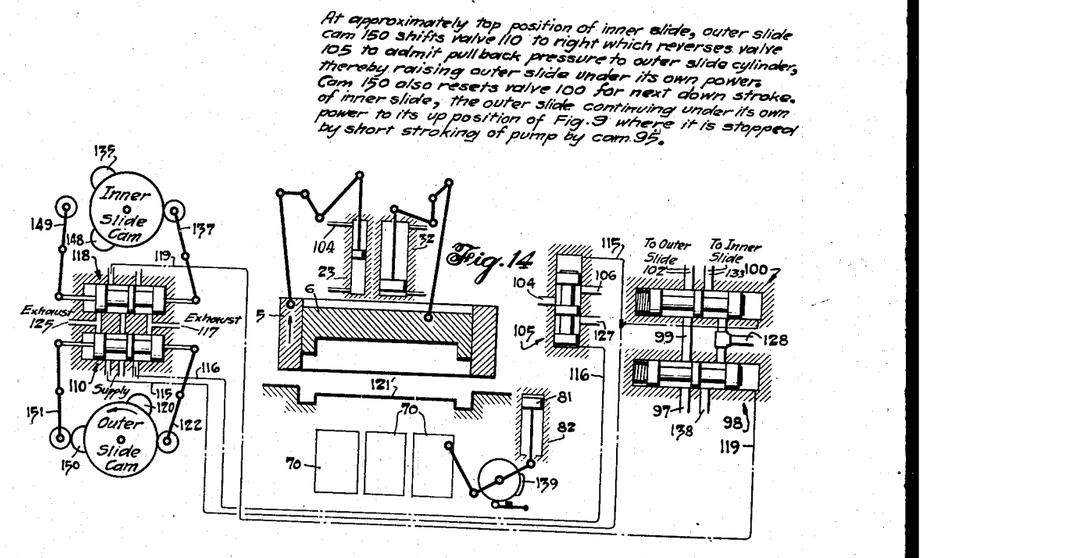
Figure 15:
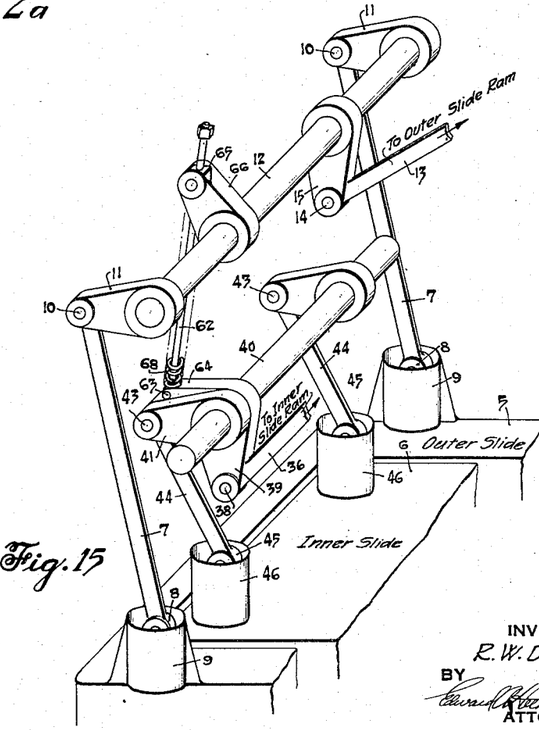
Fig. 15 is a diagrammatic perspective of one-half of the toggle systems for the inner and outer slides.

*Pullback operation of outer slide.*—As the inner slide continues to move upwardly, rods 62 (Fig. 8) will slide upwardly through the pivoted collars 65. By the time the inner and bottom slides are withdrawn from the formed work piece 121', the spring supported collar 67 will have engaged said collar and started to rotate arm 66 counterclockwise. The outer slide is thus picked up and mechanically moved upwardly by the continued upward movement of the inner slide. When the inner slide is approximately half way up (Fig. 13), the outer slide will have been raised from the work piece. At approximately the same time, said upward movement of the inner slide will cause cam 148 to be rotated counterclockwise into engagement with a pilot valve lever 149 to shift pilot valve 118 to the right. Control pressure is thereupon admitted from pipe 109 to pipe 119 to cause valve 98 to be moved to its starting position at the left. This is just a resetting operation of this particular valve, it having no further effect at the moment. Also, when pilot valve 118 is thus shifted to the right, it is adapted, if so desired, to release the cushioning pressure and permit stripping of the work piece. This will be described later. When the inner slide has approximately reached its upper position, cam 150 will have been rotated by the outer slide, to engage a pilot valve lever 151 (Fig. 14), thereby moving pilot valve 110 to the right to connect control pressure pipe 109 with pipe 115 and also connecting pipe 116 to exhaust 117. Thereupon the outer slide pullback control valve 105 is moved downwardly to connect the pump through pipes 132, 103, 106 and 104 to the pullback end of the outer slide cylinder 23, thereby to raise the outer slide under its own hydraulic power. The inner slide continues to move upwardly under its own power. When the outer slide is in its uppermost position, the coordinating arms 66 (Fig. 8) will have moved upwardly to carry the pivoted collars 65 away from the spring supported collar 67. Prior to the connection of pipes 103 and 104, control valve 105 was in its uppermost position, thereby preventing the pump from supplying fluid from the pipe 106 to pipe 104. However, due to the outer slide ram 22 moving downwardly through the coordinating connection of the slides, it was necessary to supply filling fluid to the upper end of cylinder 23, and this was accomplished by the connection from the filling tank 108 through pipes 128, 127, control valve 105 in its upper position and pipe 104, it being understood that the filling fluid is under a predetermined minimum air pressure. The shifting of valve 100 to the left upon occurrence of cam 150 engaging pilot valve lever 151 is merely a resetting operation of the valve 100 to its starting position for a subsequent down stroke of the press. This resetting of the valve does, however, connect pipe 133 to exhaust pipe 128. Also the rate of return movement of the inner and outer slides is definitely controlled by the rate of discharge from pipe 102 through a leak port 154 in check valve 101, it being understood that the check valve is constantly connected to the pipe 97 which is now the suction side of the pump. This control of the return speed is supplemented by the action of the outer slide operated cam 143 (Fig. 9) in gradually short-stroking the pump to the point where it brings the upward movement to a stop, it being understood that cams 95 and 143 are operated in synchronism with outer slide 5 by being connected, for example, with shaft 12. The press is now in position for restarting its cycle of operation.

It will, of course, be understood that the various cams can be relatively adjusted to effect initiation of slide movements and power control at any desired points of slide travel.

*Alternative or simultaneous press or cushioning operations of bottom slides.*—As previously described, there is a plurality of bottom action tables or slides 70 each suitably guided for vertical movement and each being operated from a common shaft 75 by its own set of arms, links and pivots 71—74. Each slide (Figs. 1 and 6) is provided with a downwardly projecting cushioning cylinder 160 in which a stationary ram 161 is disposed. The ram is disposed on top of the lower cross-beams 76 by overlying shaft 75 and serving as a bearing cap therefor. Bolts 162 secure the ram to the cross-beam 76. A suitable passageway 163 extends through the ram to the interior of the cylinder and is connected by a pipe 164 to a two-way valve 165. One side of this valve is connected by a pipe 166 to a filling tank pressure pipe 167 while the other side of the valve is connected to an exhaust or leakage pipe 168 leading to any suitable leakage tank or sump 170. The cushioning mechanism in its structure, operation and control is identical for all three bottom action tables, and hence similar parts are given the same reference numbers.

There are several alternative or simultaneous press and cushioning operations possible by my improved bottom slide construction and control. These are as follows. First. The straight press operation of the bottom slides heretofore described is accomplished by rendering the cushioning apparatus inoperative by moving valves 165 to their lowermost position shown, Fig. 9. In this case, the triple press operation is effected through movement of ram 81, link 79 and arm 78 which rotates shaft 75 and accordingly causes the plurality of sets of links 71 to reciprocate their respective slides 70. It will be understood that each slide has its own pair of links 71 located respectively at the sides of the cushioning cylinders 160 as shown in Fig. 1. Second. If it is desired to utilize only one or more of the bottom slides for a triple press operation, then the links 71 of the other slides are disconnected from their pivots 73 and swung to an idle position to be bolted (Fig. 6) through suitable lugs 170 to lugs 171 formed on the respective slides 70. This will permit only the remaining connected slide or slides to perform a press operation under the action of ram 81. Third. If it is desired to utilize the disconnected slide for cushioning purposes, in combination with having the other connected slides perform press operations, then it is only necessary to raise the respective valve 165 for the disconnected slide to admit csuhioning pressure to its cylinder 160. This slide or slides can then function for cushioning purposes while the other slide or slides perform press operations. Fourth. To utilize all slides for cushioning and at the same time to insure equalization between them, the main ram link 79 is disconnected from arm 78 while all of the other links 71 remain connected to their respective cylinders 160 and to the common shaft 75. All of the valves 165 are then raised to admit cushioning pressure to each cushioning cylinder and due to the connection of all links 71 to the common shaft 75, it is seen that the slides must function uniformly together.

The foregoing press and cushioning operations are accomplished by a structure which is extremely compact, very sturdy and relatively simple considering the type of structure and the functions performed thereby. Certain of the elements perform a multiplicity of operations during the press and cushioning operations by having links 71 and shaft 75 function not only as cushion equalizing means but also as press operating mechanism. The rams 161 also function not only as part of the cushioning mechanism but also facilitate guiding of the slides due to their rigidly supported relation to the sturdy cross-beams 76, although the slides are primarily guided by usual guideways. The foregoing results as well as other features inherent in the structure are highly conducive to minimizing the weight, cost and maintenance as well as providing a more simple and compact machine.

When the cushioning action is effective, the slides 70 are urged upwardly under air pressure acting on the filling tank liquid. As the outer slide engages the blank and the inner slide continues its downward press movement, the slides 70 move downwardly to discharge liquid from their cylinders 160 back into the filling tank. Substantially when the inner slide has reached its lowermost position, cam 135 has moved in a clockwise direction to engage pilot valve lever 137 to shift valve 118 to the left. Valve 118 thereupon connects the control pressure pipe 109 with a pipe 175 to close a cushion cylinder control valve 176. Filling tank pressure is thereby prevented from flowing back into the cushion cylinders, and hence the slides 70 will remain in their lower depressed position. However, after the inner slide has moved upwardly and mechanically carried the outer slide therewith so as to release the work piece from the blank holding force, then cam 148 is rotated in a counterclockwise direction to engage pilot lever 149 and shift valve 118 to the right. Pipe 175 is thereupon connected to exhaust pipe 117 to permit valve 176 to open. The filling tank pressure then flows to the cushion cylinders 160 to raise slides 70 and eject or strip the formed work piece and reset the cylinders for a further cushioning operation. Hence it is seen that the inner slide cam control cooperates with the cushion control valve 176 to perform a delayed action of the cushion cylinders so that they function as strippers. This delayed action may be effective when only one or a plurality of the bottom slides 70 are used for cushioning purposes, even though the other slides are performing press functions.

*Limiting and safety action of rams and cylin-*

*ders during operation of toggle mechanism.—* Each of the inner and outer slide rams and cylinders and the bottom slide ram and cylinder function not only as force producing mechanism for operating the various slides but also function to positively limit the action of the various toggle systems while at the same time permitting sufficient flexibility in the operation thereof so as to prevent destruction or injury to the press or die in the event of abnormal conditions. To accomplish this, I have shown in Fig. 7 one ram and cylinder (for example 22 and 23) as illustrative of the particular function and construction used in all of the rams and cylinders. The fluid connection to the end of the cylinders is through a port 180 which is spaced inwardly from the cylinder head, thereby permitting the ram 22 to overrun this port and trap oil beneath the ram for cushioning purposes. However, the ram has a straight cylindrical portion 181 and a tapered portion 182 whereby the tapered portion 182 gradually cuts off flow of liquid through port 180 as the ram passes thereover until finally the straight cylindrical portion 181 completely covers port 180 with a small positive overlap thereof. The relation of parts and the clearance of the cylindrical portion of the ram to permit leakage is such that the fluid is only momentarily trapped, thereby allowing the ram head to mechanically seat on the cylinder head to provide a positive limit of movement for the toggle system. Thus unrestricted ram movement is permitted throughout the major portion of the cylinder, but this movement is rapidly and smoothly brought to a positive dead stop without danger to the structure, this being in cooperation with the further function of the ram and cylinder to serve as a safety means, upon occurence of abnormal conditions, in that ram movement ceases when an opposing force equals the hydraulic operating force of the ram regardless of whether the toggles and slides have completed their movement. To provide rapid initial movement of the ram away from the cylinder head when pump pressure is supplied to passage of port 180, a bypass 184 connects said passage to the lowermost portion of the cylinder. However, during the cushioning operation at the end of the stroke to obtain the positive limiting action above described, the trapped fluid in the cylinder is prevented from discharging through bypass 184 by reason of a spring pressed check plunger 185. This plunger opens when pump pressure is supplied to port 180. The upper end 186 of ram 23 is provided with a similar tapered and straight portion cooperating with a port and bypass of identical construction and operation as that just described. Hence it is not necessary to further describe the same or to describe similar constructions for the other rams and cylinders.

As shown in Figs. 1 and 6, the bottom slides 70 may be individually vertically adjusted relative to the operating links 71. This is accomplished by having the pivotal connection 72 in the form of eccentrics on a shaft 200. This shaft is journalled in the slide at its two ends 201 and also at its central portion. A worm gear 202 is secured to the central portion of shaft 200 while a worm gear 203, Fig. 6, is suitably journalled in the upper portion of the cushion cylinder and is provided with a square wrench receiving head 204. Hence by suitably adjusting worm gear 203, the eccentrics are angularly adjusted so as to adjust the relative height of the individual bottom slides. The worm and worm gear constitute a self-locking arrangement. The foregoing adjusting mechanism moves up and down with the slide but does not interfere in any way either with the cushioning action of the cushioning cylinder or the links 71 during press operation of the bottom slides.

*Double action press.*—When all of the bottom slides perform a cushioning function, the inner and outer slides then perform the sole press operations. In this case it is necessary to reverse the upper slides upon completion of the inner slide draw stroke. This is accomplished by disconnecting switch 87 from thruster 88 and connecting the latter to a switch 178 (Fig. 9) adapted to be opened by a cam 179 operated by the inner slide through the mechanical connections therewith. Hence upon completion of the inner slide draw stroke, thruster 88 will be deenergized and the pump reversed to supply pullback fluid to the main cylinders 23 and 32 in the same manner as previously described for the other operations.

From the disclosure herein of the press structure as well as the control system, it is seen that a highly compact and rugged press is provided while at the same time maintaining a high degree of flexibility of operation and adjustment with maximum safety and dependability, together with the many other advantages heretofore mentioned.

It will of course be understood that various changes in details of construction and arrangement of parts may be made by those skilled in the art without departing from the spirit of the invention as set forth in the appended claims.

I claim:

1. A press having frame sides and a top cross-member connecting said sides, a slide guided by said frame sides, toggle mechanism for operating said slide, a hydraulic cylinder supported by and depending from said cross-member so as to project down between said frame sides intermediately thereof, means for connecting said toggle mechanism to said cross-member at points between said frame sides and cylinder, a cross-head guide supported by and projecting upwardly from said cross-member, a cross-head in said guide connected to said toggle mechanism, a ram in said cylinder connected to said cross-head for actuating the same, and means for supplying actuating fluid to the lower operating end of said ram and cylinder so that the ram moves upwardly when said slide moves downwardly and the pressure force in the lower operating end of said cylinder exerts a downward force on the intermediate portion of said cross-member while the toggle system exerts an upward reaction force on said cross-member.

2. A press having frame sides and a cross-member connecting the same, inner and outer slides, a plurality of vertically extending hydraulic rams and cylinders located substantially in a common transverse plane and dependently supported by said cross-member intermediately of said frame sides, toggle mechanisms connected to said slides respectively and to said cross-member at points between said frame sides and cylinders, means for connecting the upper ends of one of said rams to certain of said toggle mechanisms, means for connecting the other of said rams to the remainder of said toggle mechanisms, and means for supplying actuating fluid to the lower operating ends of said cylinders so that the rams move upwardly when the slides move downwardly and the pressure forces on the lower operating ends of said cylinders exert downward forces on the intermediate portion of said cross-member while the toggle mechanisms exert upward reaction forces on said cross-member.

3. The combination set forth in claim 2 further characterized in that said frame has sides and a top cross-member connecting the same, said cylinders being supported by and depending from said cross-member, crosshead guides supported by and projecting upwardly from said cross-member, and said means for connecting the upper ends of said rams to their respective toggle mechanisms includes crossheads in said guides having connections respectively with said toggle mechanisms and said rams.

4. A press comprising frame sides and a cross-member connecting the same, a slide having a recess in its top side, toggle mechanism for operating the same, a hydraulic ram operatively connected to said toggle mechanism, and a ram cylinder dependently supported by said cross-member and adapted to be partially received within said slide recess when the latter is in its pull-back position.

5. The combination set forth in claim 6 further characterized by the provision of means for supplying filling fluid to the cylinder of the mechanically moved toggle system during mechanical movement thereof and thereafter supplying operating fluid thereto.

6. A press comprising, in combination, a frame, a plurality of slides, a toggle system for one slide and a second toggle system for the other slide, hydraulic rams and cylinders respectively adapted to effect independent hydraulic power actuation of said toggle systems during certain operations thereof, and means for mechanically moving one toggle system by the second system during hydraulic actuation of the latter and subsequently allowing continued movement of the first system by hydraulic actuation of its own ram independently of the hydraulic actuation of the second system, whereby said slides have similar movement when one toggle system is mechanically moved by the other and is adapted to have dissimilar movement when independently actuated.

7. A press comprising, in combination, a frame, a slide, mechanical operating arms and links for said slide, means for connecting said mechanical operating elements to and for disconnecting the same from said slide, ram and cylinder elements one of which is stationary and the other of which is movable with said slide, and means for rendering said ram and cylinder elements operative for cushioning purposes upon disconnection of said mechanical operating elements from said slide.

8. A press comprising, in combination, a frame, a plurality of bottom slides, a shaft disposed beneath said slides, mechanical operating elements between said shaft and slides for effecting pressing functions, means for connecting said mechanical operating elements to and for disconnecting the same from said slide, rams and cylinders associated with the respective slides, and means for rendering said rams and cylinders individually and selectively operable for cushioning purposes upon disconnection of the mechanical operating elements for the selected cushioning slide while the mechanical means of another slide remain operative to perform a press function.

9. The combination set forth in claim 8 further characterized by the provision of members common to both said shaft and cushioning rams to support the same.

10. A press comprising, in combination, a frame having inner and outer slides and a bottom slide, hydraulically operated rams and cylinders for individually operating said slides, a hydraulic pump for supplying operating fluid to said cylinders, means adapted upon initiation of a press cycle to control the operating fluid from said pump to said outer slide cylinder to move the outer slide into contact with a work piece, means responsive to a predetermined condition of operation of said outer slide for thereafter automatically controlling the operating fluid from said pump to said inner slide cylinder to cause the inner slide to perform a drawing operation, means responsive to a predetermined condition of operation of said inner slide for controlling the operating fluid from said pump to said bottom slide cylinder to cause upward movement of the bottom slide automatically while the inner slide remains at the end of its drawing stroke, and means responsive to a predetermined condition of operation of said bottom slide for automatically controlling the operating fluid from said pump to effect return movement of all of said slides.

11. A hydraulic press comprising, in combination, a frame having inner and outer slides and a bottom slide, operating and pull-back ram and cylinder elements associated with each slide, a source of operating fluid pressure and control means therefor having forward and reverse positions, means for causing said inner and outer slides to have initial down movement when said control means is adjusted to its forward position, means whereby upon completion of the said down movement of the inner and outer slides fluid from said source is supplied automatically to the bottom slide cylinder to effect an upward bottom slide movement, and means adapted upon completion of said bottom slide movement to move said control means automatically to its reverse position to supply pull back fluid to the pull-back cylinders of the inner and bottom slides to impart pull back movement thereto.

12. A hydraulic press comprising, in combination, a frame having inner and outer slides each provided with its own operating ram and cylinder, hydraulically operated pull back means for said slides, continuously operable unidirectional rotating pump of the reversible positive displacement type, means for causing down movement of said inner and outer slides by adjusting said pump to its forward discharge position and adapted upon completion of down movement of said outer slide to continue down movement of the inner slide, and means responsive to a predetermined condition of operation of said inner slide to reverse said pump and supply fluid to said pull back means for returning said inner and outer slides.

13. A press comprising, in combination, a frame having inner and outer slides and a bottom slide, hydraulically operated force producing means for individually operating said slides, hydraulic pumping means for supplying pressure fluid to said operating means, a control system adapted upon initiation of a press cycle to cause said outer slide to move into contact with the work piece and thereafter to cause the inner slide to perform a drawing operation followed by upward movement of the bottom slide while the inner slide remains at the end of its drawing stroke, and means for thereafter returning said slides to their original position, said control system including a plurality of pilot valves and operating cams respectively connected to said inner and outer slides, slide control valves operated by said pilot valves, and means rendered operative during certain slide movements for resetting certain of said control valves to effect a subsequent press cycle.

14. A press comprising, in combination, a frame having inner and outer slides, means for mechanically imparting movement to the inner slide from the outer slide during downward movement of the inner slide and vice versa during pull-back operation, a hydraulic ram and cylinder for one slide and another ram and cylinder for the other slide, hydraulic pumping means for supplying operating fluid to said cylinders, means for supplying pressure fluid from said pump only to said outer slide and cylinder during an initial press operation thereby to move the inner and outer slides downwardly together under the power of only the outer slide ram, and means rendered operative substantially upon contact of the outer slide with a workpiece to then supply pressure fluid from said pump to the inner slide cylinder to cause the inner slide to perform a drawing operation under its own power while the outer slide remains stationary.

15. The combination set forth in claim 14 further characterized by the provision of control means adapted to initially effect pull-back movement of the inner slide while the outer slide remains stationary, said mechanical means then causing the inner slide to pick up said outer slide and move the same mechanically, and means for thereafter supplying pressure fluid from said pump to the pull-back means of the outer slide whereby both slides are then returned under their own power to their uppermost position.

16. The combination set forth in claim 14 further characterized by the provision of control means adapted to initially effect pull-back movement of the inner slide while the outer slide remains stationary, said mechanical means then causing the inner slide to pick up said outer slide and move the same mechanically, means for thereafter supplying pressure fluid from said pump to the pull-back means of the outer slide whereby both slides are then returned under their own power to their uppermost position, and means controlled by slide movement to reduce automatically the volume of pumped fluid to a point that will just hold the slides in their pull-back position.

17. A hydraulic press comprising, in combination, a frame having inner and outer slides and a bottom slide, each slide having its own operating ram and cylinder, a continuously operable uni-directional rotating pump of the reversible positive displacement type, means for initiating down movement of said inner and outer slide by adjusting said pump to its forward discharge position, means whereby upon completion of the down movement of said inner and outer slides fluid from said pump is supplied to the bottom slide cylinder to effect an upward bottom slide movement, means adapted upon completion of said bottom slide movement to reverse said pump and supply pull-back fluid to the inner and bottom slide cylinders to impart pull-back movement thereto, and means for subsequently imparting pull-back movement to the outer slide.

18. The combination set forth in claim 17 further characterized in that the means for reversing the pump includes a bottom slide operated cam controlled switch.

19. A hydraulic press comprising, in combination, a frame having inner and outer slides and a bottom slide, each slide having its own operating ram and cylinder, a continuously operable uni-directional rotating pump of the reversible positive displacement type, means for initiating down movement of said inner and outer slide by adjusting said pump to its forward discharge position, means whereby upon completion of the down movement of said inner and outer slides fluid from said pump is supplied to the bottom slide cylinder to effect an upward bottom slide movement, and means adapted upon completion of said bottom slide movement to reverse said pump and supply pull-back fluid to the inner and bottom slide cylinders to impart pull-back movement thereto.

20. A hydraulic press comprising, in combination, a frame having inner and outer slides each provided with its own operating ram and cylinder, hydraulically operated pull back means associated with said slides, a source of operating pressure fluid, means for initiating down movement of said slides by controlling supply of operating fluid to said outer slide cylinders, a pilot valve for controlling supply of operating fluid to the inner slide cylinder, and means responsive to a predetermined position of said outer slide for automatically operating said pilot valve to supply operating fluid to the inner slide cylinder.

21. A press comprising, in combination, a frame having a pair of slides, operating and pull back cylinders for each of said slides, a source of operating pressure fluid, means for directing fluid from said source to operating cylinder to move said slides and cause one slide to continue movement after the other has stopped, means for causing both slides to have initial return movement by supplying pressure from said source to the pull back cylinder of one of said slides, a filling tank, and means whereby filling fluid is supplied from said tank to the pull back cylinder of the second slide during said initial return movement thereof, and means responsive to a predetermined condition of operation of said slides for automatically shutting off said filling fluid and thereafter supplying operating fluid from said source to the pull back cylinder of said second slide.

22. A hydraulic press comprising, in combination, a frame having inner and outer slides, operating and pull back cylinders and rams for said slides, a source of operating pressure fluid having a pair of pipes one of which supplies fluid from the source and the other pipe returns the fluid thereto, or vice versa, one of said pipes having continuous communication with the operating cylinder for the outer slide and the other pipe having continuous communication with the pull back cylinder for the inner slide cylinder, a control valve movable to connect the source of pressure supply to the operating cylinder of the inner slide automatically upon occurrence of a predetermined operating condition of the outer slide, and means for interchanging the supply and return functions of said pipes thereby to return said slides.

23. A hydraulic press comprising, in combination, a frame having inner and outer slides, operating and pull back cylinder and ram means for said slides, a source of operating fluid having discharge and return pipes, means for connecting the discharge pipe to the operating cylinders of said slides to effect movement thereof, means for reversing the discharge and return functions of said pipes to direct fluid from said source to the pull back means for the inner slide, and means responsive to a predetermined return position of the inner slide for connecting the pressure side of said supply to the pull back means of the outer slide.

24. A hydraulic press comprising, in combination, a frame having a slide, a hydraulic ram and cylinder for operating said slide, a source of operating fluid for said cylinder, a pilot valve for controlling the supply of operating fluid for said cylinder, a pair of opposed arms connected to said pilot valve, an oscillating cam disposed between said arms and having two cam surfaces respectively engageable with said arms, and means for oscillating said cams in accordance with movement of said slide to control the operation thereof.

RICHARD W. DINZL.